US012280834B2

(12) United States Patent
Wang et al.

(10) Patent No.: US 12,280,834 B2
(45) Date of Patent: Apr. 22, 2025

(54) FULL-LOAD PASSENGER CAR BODY STRUCTURE

(71) Applicant: NextGen Exchange Group Inc., Grand Cayman (KY)

(72) Inventors: Jianjiang Wang, Zhangzhou (CN); Fuwen Xiao, Zhangzhou (CN)

(73) Assignee: Nextgen Exchange Group Inc., Grand Cayman (KY)

( * ) Notice: Subject to any disclaimer, the term of this patent is extended or adjusted under 35 U.S.C. 154(b) by 280 days.

(21) Appl. No.: 17/896,728

(22) Filed: Aug. 26, 2022

(65) Prior Publication Data

US 2023/0303171 A1   Sep. 28, 2023

(30) Foreign Application Priority Data

Mar. 24, 2022   (CN) .......................... 202220708196.X

(51) Int. Cl.
*B62D 31/02*   (2006.01)
*B62D 21/02*   (2006.01)

(52) U.S. Cl.
CPC ........... *B62D 31/025* (2013.01); *B62D 21/02* (2013.01)

(58) Field of Classification Search
CPC .... B62D 31/02; B62D 31/025; B62D 23/005; B62D 21/02; B62D 21/03; B62D 62/025

USPC ................................. 296/178; 280/781, 797
See application file for complete search history.

(56) References Cited

U.S. PATENT DOCUMENTS 7,261,322 B2 *   8/2007   Ito .......................... B62D 21/02
                                                                280/795
11,161,560 B2 *   11/2021   Anderson ............ B62D 63/025

\* cited by examiner

*Primary Examiner* — Dennis H Pedder
(74) *Attorney, Agent, or Firm* — Dorsey & Whitney LLP

(57) ABSTRACT

The present disclosure relates to a full-load passenger car body structure including a roof frame, a side wall frame, a rear frame and an underframe. The side wall frame is enclosed to form an accommodating space, the roof frame is disposed on an upper part of the side wall frame, and the underframe is disposed on a lower part of the side wall frame, where a plurality of reinforcing members are disposed on the underframe and used for reinforcing connection strength of the underframe. Therefore, the connection strength of the underframe is reinforced by disposing the plurality of reinforcing members on the underframe, thereby increasing the strength of the full-load passenger car body structure, and the structure is simple and light without reinforcement, so that the overall weight of the full-load passenger car body structure can be reduced while meeting the requirements for carrying capacity of the underframe.

9 Claims, 2 Drawing Sheets

FULL-LOAD PASSENGER CAR BODY STRUCTURE

CROSS-REFERENCE TO RELATED APPLICATIONS

This application claims priority to Chinese Patent Application No. CN 2022 2070 8196.X, filed Mar. 24, 2022, which is incorporated by reference herein, in the entirety and for all purposes.

FIELD

The present disclosure relates to the field of vehicle manufacturing technologies, and in particular to a full-load passenger car body structure.

BACKGROUND

Passenger cars are important vehicles for carrying passengers, such as buses or long-distance buses. For a passenger car with a double rear axle structure, an overall frame is a half-load girder structure. Thus, the passenger car body structure with the double rear axle structure has low strength, poor safety performance, and hidden dangers endangering personal safety of passengers. Meanwhile, because of the girder structure itself, the overall frame of the passenger car with the double rear axle structure is heavy, which increases energy consumption and transportation costs of the passenger car.

SUMMARY

To overcome problems in the related art, the present disclosure provides a full-load passenger car body structure.

According to embodiments of the present disclosure, a full-load passenger car body structure includes a roof frame, a side wall frame, a rear frame and an underframe. The side wall frame is enclosed to form an accommodating space, the roof frame is disposed on an upper part of the side wall frame, and the underframe is disposed on a lower part of the side wall frame, where the underframe is divided into a front section area, a front axle area, a middle section area and a rear axle area from front to back, where a plurality of reinforcing members are disposed on the underframe and used for reinforcing connection strength of the underframe.

In one implementation, the underframe includes two main longitudinal beams and a plurality of transverse beams, the plurality of transverse beams are disposed perpendicularly to the main longitudinal beams respectively, and the reinforcing members are disposed at joints between the transverse beams and the main longitudinal beams.

In one implementation, the middle section area includes two first longitudinal beams and a plurality of first transverse beams, the plurality of first transverse beams run through the two first longitudinal beams and are disposed perpendicularly to the first longitudinal beams respectively, both ends of the plurality of first transverse beams are connected to the side wall frame respectively, and first diagonal tie bars are disposed in a space enclosed by the two first longitudinal beams and the plurality of first transverse beams.

In one implementation, the rear axle area includes two second longitudinal beams and a plurality of second transverse beams, the plurality of second transverse beams are disposed outside the second longitudinal beams, disposed perpendicularly to the second longitudinal beams respectively, and connected at opposite positions of the two second longitudinal beams respectively, the reinforcing members are disposed between the two second longitudinal beams, and both ends of the reinforcing members are connected to the rear axle area and the middle section area respectively.

In one implementation, a first end of the rear axle area is connected to the first transverse beam at one end of the middle section area, and a second end of the rear axle area is connected to the rear frame; where connecting rods are disposed at the second end of the rear axle area and connected to the two second longitudinal beams, the rear frame and one end of the reinforcing members respectively.

In one implementation, two second diagonal tie bars are disposed on the two second longitudinal beams at the second end of the rear axle area respectively, and the second diagonal tie bars are connected to the second longitudinal beams and the rear frame respectively.

In one implementation, the two first longitudinal beams are integrally connected or detachably connected to the two second longitudinal beams respectively.

In one implementation, the reinforcing members include first reinforcing members and second reinforcing members; where the first reinforcing members are disposed at joints between the first longitudinal beams and the first transverse beams and joints between the second longitudinal beams and the second transverse beams; the first reinforcing members include third diagonal tie bars; the second reinforcing members include two longitudinal bars and a plurality of crossbars, and the plurality of crossbars are disposed at intervals and connected perpendicularly to the longitudinal bars respectively.

In one implementation, the two longitudinal bars are disposed in parallel, and the plurality of crossbars are disposed in parallel at an equal interval.

In one implementation, the rear axle area includes two rear axle supports enclosed by the two second longitudinal beams and the plurality of second transverse beams.

The technical solutions provided by the embodiments of the present disclosure may provide the following beneficial effects:

1. A full-load passenger car body structure is provided to improve the carrying capacity and ensure personal safety of passengers;
2. The connection strength of an underframe is reinforced by disposing a plurality of reinforcing members on the underframe, thereby increasing the strength of the full-load passenger car body structure and the safety performance; and
3. The structure is simple, so as to reduce the overall weight of the full-load passenger car body structure, achieve light weight and reduce energy consumption.

It should be understood that both the foregoing general description and the detailed descriptions below are merely exemplary and explanatory and are not intended to limit the present disclosure.

BRIEF DESCRIPTION OF DRAWINGS

The drawings here are incorporated in the description, forming an integral part of it. They present embodiments in line with the present disclosure and, together with the description, are used to explain the principles of the present disclosure.

Figure 1:
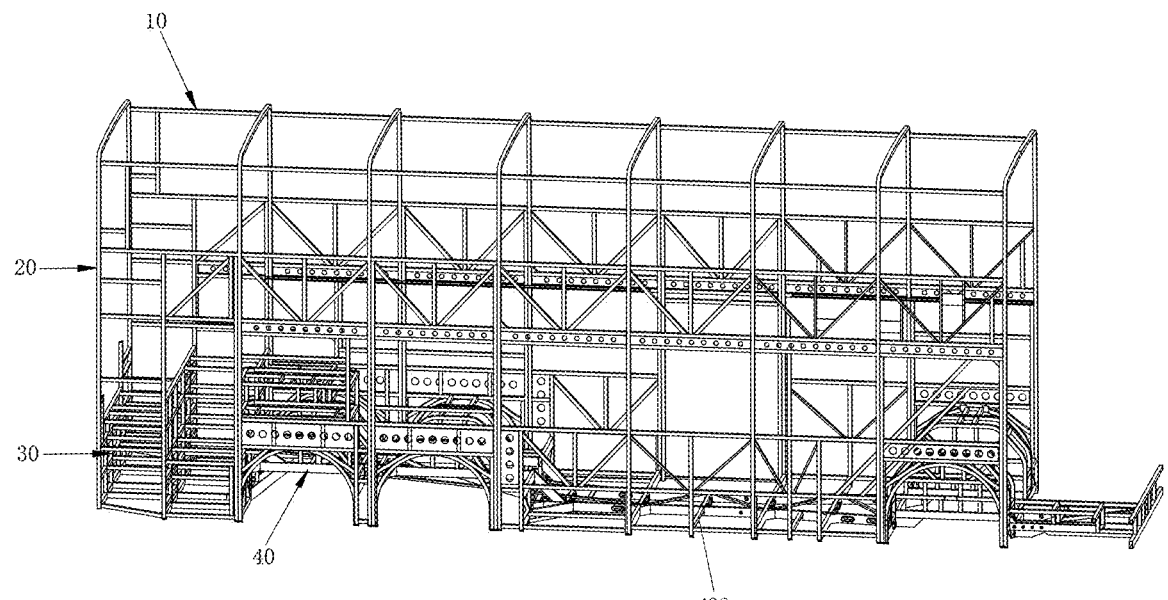
FIG. 1 is a schematic diagram of a full-load passenger car body structure according to an exemplary embodiment.

Description of reference numerals in the drawings: roof frame 10; side wall frame 20; rear frame 30; underframe 40, front section area 41, front axle area 42, middle section area 43, rear axle area 44, reinforcing members 45, main longitudinal beams 46, transverse beams 47, connecting rods 48, first longitudinal beams 431, first transverse beams 432, first diagonal tie bars 433, second longitudinal beams 441, second transverse beams 442, second diagonal tie bars 443, first reinforcing members 451, second reinforcing members 452, corner connector structures 4511, third diagonal tie bars 4512, longitudinal bars 4521 and crossbars 4522.

DETAILED DESCRIPTION

Exemplary embodiments will be described in detail herein, examples of which are shown in the accompanying drawings. Where the following description relates to the accompanying drawings, unless otherwise indicated, the same number in different accompanying drawings indicates the same or similar element. Implementations described in the following exemplary embodiments do not represent all implementations consistent with the present disclosure, but merely examples of an apparatus and a method that are consistent with some aspects of the present disclosure, as described in detail in the appended claims.

Examples

Figure 2:
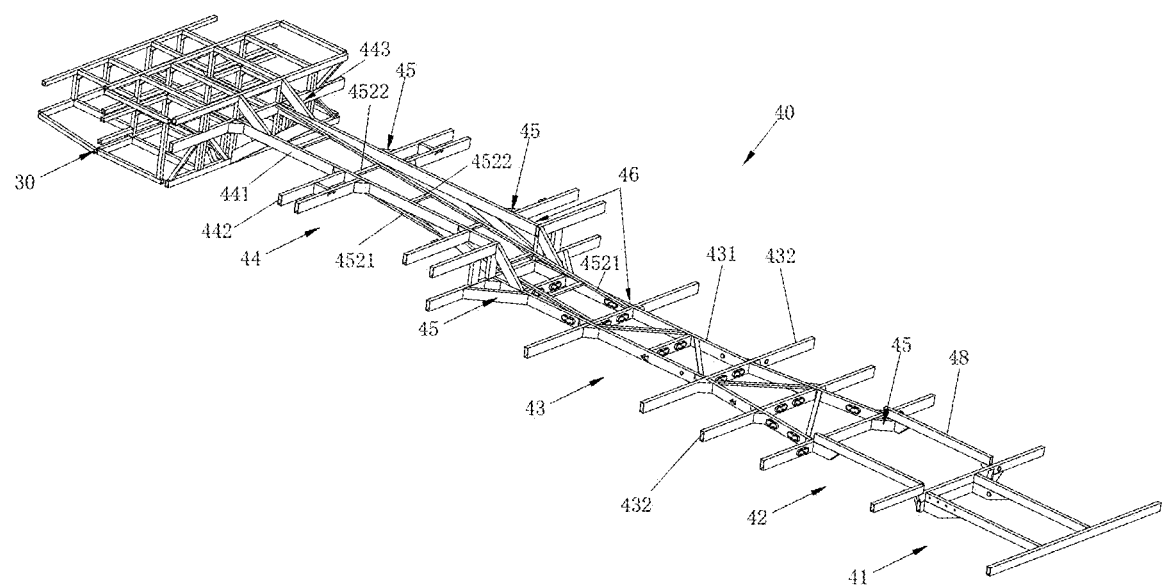
FIG. 2 is a schematic diagram of a structure of an underframe according to an exemplary embodiment.
Figure 3:
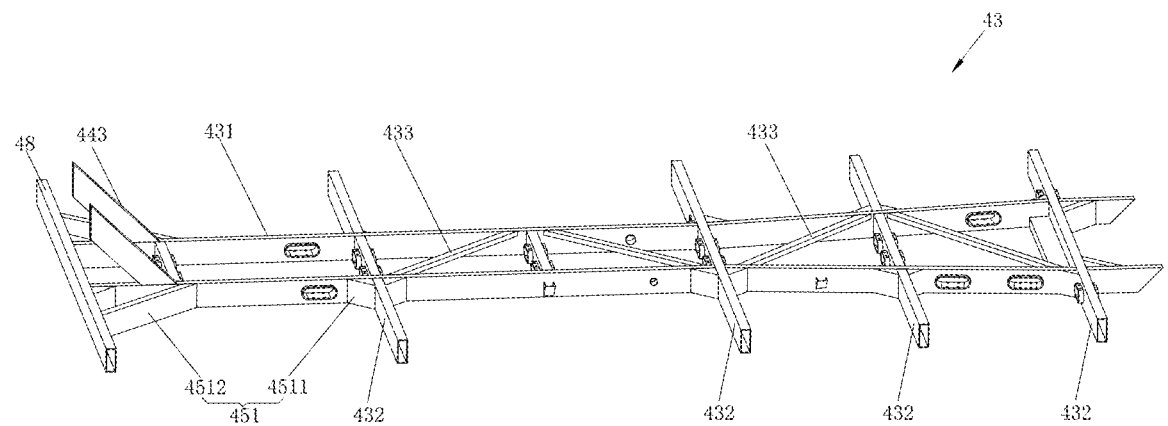
FIG. 3 is a schematic diagram of a middle section area on an underframe according to an exemplary embodiment.
Figure 4:
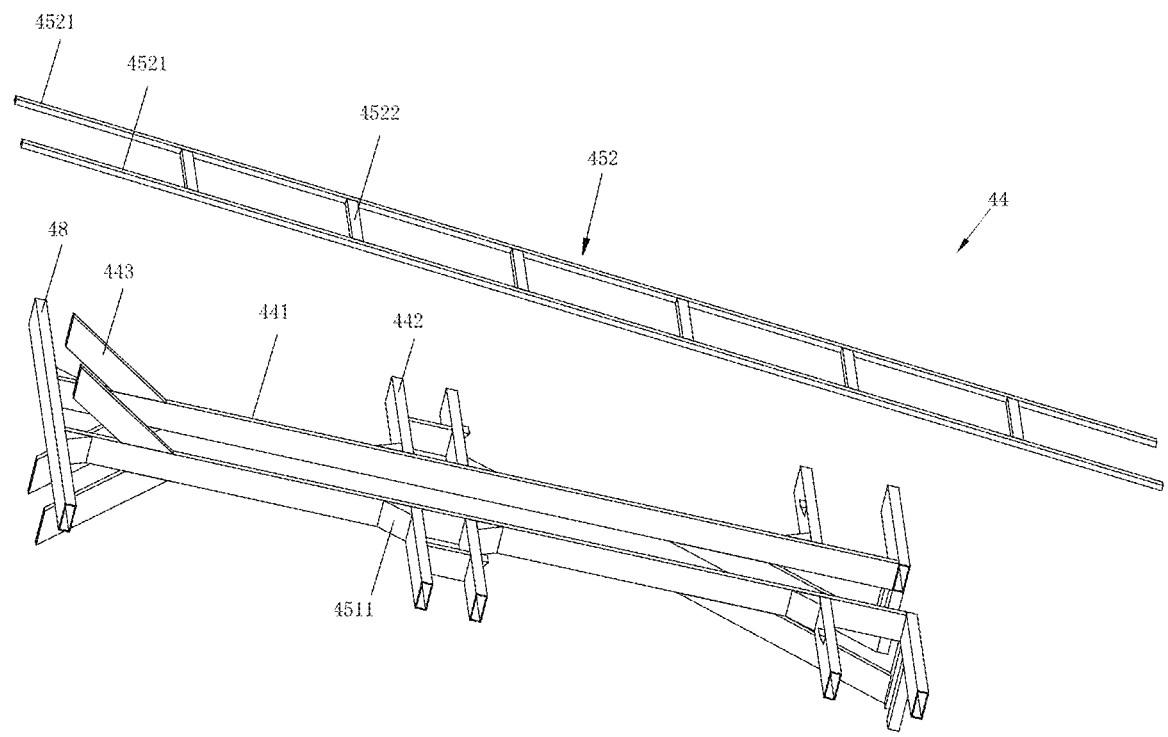
FIG. 4 is a schematic diagram of a rear axle area on an underframe according to an exemplary embodiment.

FIG. 1 is a schematic diagram of a full-load passenger car body structure according to an exemplary embodiment. FIG. 2 is a schematic diagram of a structure of an underframe 40 according to an exemplary embodiment. FIG. 3 is a schematic diagram of a middle section area 43 on an underframe 40 according to an exemplary embodiment. FIG. 4 is a schematic diagram of a rear axle area 44 on an underframe 40 according to an exemplary embodiment.

To solve related technical problems, embodiments of the present disclosure provide a full-load passenger car body structure. As shown in FIG. 1 to FIG. 4, the full-load passenger car body structure includes a roof frame 10, a side wall frame 20, a rear frame 30 and an underframe 40, where the side wall frame 20 is enclosed to form an accommodating space capable of accommodating passengers, the roof frame 10 is disposed on an upper part of the side wall frame 20, and the underframe 40 is disposed on a lower part of the side wall frame 20 and can carry the side wall frame 20 and the roof frame 10. The underframe 40 can be divided into a front section area 41, a front axle area 42, a middle section area 43 and a rear axle area 44 from front to back. The front section area 41 can be used for disposing a cab, the front axle area 42 can be used for mounting front wheels, the middle section area 43 can be used for accommodating passengers, and the rear axle area 44 can be used for mounting rear wheels. A plurality of reinforcing members 45 are disposed on the underframe 40 and used for reinforcing connection strength of the underframe 40 to meet the needs of carrying the roof frame 10, the side wall frame 20 and passengers.

According to an embodiment of the present disclosure, a full-load passenger car body structure is provided to improve the overall carrying capacity of a full-load passenger car and ensure personal safety of passengers; the connection strength of the underframe 40 is reinforced by disposing the plurality of reinforcing members 45 on the underframe 40, thereby increasing the strength of the full-load passenger car body structure and the safety performance to meet carrying requirements of the full-load passenger car; and the plurality of reinforcing members 45 that are light, small and simple are disposed on the underframe 40 to replace a girder structure in the related art, so as to reduce the overall weight of the full-load passenger car, achieve light weight, reduce energy consumption and facilitate assembly.

Specifically, the underframe 40 includes two main longitudinal beams 46 and a plurality of transverse beams, a length direction of the two main longitudinal beams 46 is consistent with a length direction of the full-load passenger car body, the plurality of transverse beams 47 are disposed perpendicularly to the main longitudinal beams 46 respectively, and the reinforcing members 45 are disposed at joints between the transverse beams 47 and the main longitudinal beams 46 to reinforce the connection strength of the underframe 40. In actual application, some or individual transverse beams 47 are allowed to be disposed non-perpendicularly to the main longitudinal beams 46 to ensure the overall regularity of the full-load passenger car body and meet the requirements of different full-load passenger car body shapes or sizes. Therefore, the transverse beams 47 can be disposed perpendicularly to and/or crosswise with the main longitudinal beams 46 based on actual situations. Preferably, the plurality of transverse beams 47 are disposed perpendicularly to the two main longitudinal beams 46 respectively, so as to meet the carrying requirements for supporting the side wall frame 20 and the roof frame 10.

According to an embodiment of the present disclosure, the front section area 41 and the middle section area 43 are connected by two connecting rods 48, and the two connecting rods 48 are overlapped at joints between the front section area 41 and the middle section area 43 respectively to form the front axle area 42, which is used for mounting front wheels of the full-load passenger car. The middle section area 43 and the rear axle area 44 are main carrying areas of the full-load passenger car body structure. The middle section area 43 includes two first longitudinal beams 431 and a plurality of first transverse beams 432, the plurality of first transverse beams 432 run through the two first longitudinal beams 431 and are disposed perpendicularly to the two first longitudinal beams 431 respectively, both ends of the plurality of first transverse beams 432 are connected to the side wall frame 20 respectively, and first diagonal tie bars 433 are disposed in a space enclosed by the two first longitudinal beams 431 and the plurality of first transverse beams 432. The first diagonal tie bars 433 are disposed in the space to increase the stability of the space enclosed by the two first longitudinal beams 431 and the plurality of first transverse beams 432. Reinforcing members 45 are disposed at joints between the first longitudinal beams 431 and the first transverse beams 432. The structural strength of the middle section area 43 is further increased by disposing the first diagonal tie bars 433 and the plurality of reinforcing members 45. The reinforcing members 45 can be, for example, corner connectors, which are disposed at connecting corners of the first longitudinal beams 431 and the first transverse beams 432. The model, form and type of material of the corner connectors can be determined by carrying capacity of the first longitudinal beams 431 and the first transverse beams 432. The reinforcing members 45 can also be third diagonal tie bars 4512, the third diagonal tie bars 4512 are disposed at connecting corners of the first longitudinal beams 431 and the first transverse beams 432, and both ends of the third diagonal tie bars 4512 are connected to the first longitudinal beams 431 and the first transverse beams 432 respectively, so that the strength and stability of the connection between the first longitudinal beams 431 and the first transverse beams 432 can be improved. In addition, the corner connectors and the third diagonal tie bars 4512 are simple in structure, light and easy to install, which facilitates light weight of the middle section area 43. The specific structure of the reinforcing members 45 is not limited here provided that connection strength between the first longitudinal beams 431 and the first transverse beams 432 is reinforced, and light weight of the middle section area 43 is achieved.

According to an embodiment of the present disclosure, the plurality of first transverse beams 432 are connected to the first longitudinal beams 431 at an interval, and intervals between adjacent first transverse beams 432 may be the same or different. Preferably, the plurality of first transverse beams 432 are distributed at an equal interval and connected to the first longitudinal beams 431, thereby ensuring uniform stress of the first transverse beams 432 and further improving the carrying safety of the middle section area 43.

The rear axle area 44 includes two second longitudinal beams 441 and a plurality of second transverse beams 442, the plurality of second transverse beams 442 are disposed outside the second longitudinal beams 441, and the two second longitudinal beams 441 are disposed along a length direction of the full-load passenger car body. The plurality of second transverse beams 442 are disposed perpendicularly to the second longitudinal beams 441 respectively, and a plurality of transverse beams are connected at opposite positions of the two second longitudinal beams 441 respectively, that is, connecting positions of the plurality of second transverse beams 442 outside the first second longitudinal beam 441 are opposite to connecting positions of the plurality of second transverse beams 442 outside the second longitudinal beam 441. Therefore, uniform stress of the second transverse beams 442 can also be ensured, so that the carrying safety of the rear axle area 44 can be improved. Reinforcing members 45 are disposed between the two second longitudinal beams 441, and both ends of the reinforcing members 45 are connected to the rear axle area 44 and the middle section area 43 respectively, so as to increase the connection strength between the rear axle area 44 and the middle section area 43 and improve the overall stability of the underframe 40.

According to an embodiment of the present disclosure, the reinforcing members 45 include first reinforcing members 451 and second reinforcing members 452, where the first reinforcing members 451 are disposed at joints between the first longitudinal beams 431 and the first transverse beams 432 and joints between the second longitudinal beams 441 and the second transverse beams 442. The first reinforcing members 451 include corner connector structures 4511 and third diagonal tie bars 4512, the corner connector structures 4511 are disposed at connecting corners of the first longitudinal beams 431 and the first transverse beams 432 and connecting corners of the second longitudinal beams 441 and the second transverse beams 442, and the corner connector structures 4511 can be detachably connected to, integrally connected to, or welded to the first longitudinal beams 431 and the first transverse beams 432, and the second longitudinal beams 441 and the second transverse beams 442 respectively. The second reinforcing members 452 can have a ladder-shaped structure and are disposed between the two second longitudinal beams 441, and both ends of the second reinforcing members 452 are connected to the rear axle area 44 and the middle section area 43 respectively. The second reinforcing members 452 include two longitudinal bars 4521 and a plurality of crossbars 4522, the plurality of crossbars 4522 are disposed at intervals and connected perpendicularly to the longitudinal bars respectively. Preferably, the two longitudinal bars 4521 are disposed in parallel, and the plurality of crossbars 4522 are disposed in parallel at an equal interval to allow uniform stress of the second reinforcing members 452.

Further, both ends of the middle section area 43 are provided with first transverse beams 432 respectively, where two first longitudinal beams 431 on a first end of the middle section area 43 extend out of the first transverse beams 432, two connecting rods 48 on the front axle area 42 are overlapped on the extended first longitudinal beams 431, and the two first longitudinal beams 431 are connected to the first transverse beams 432 at a second end of the middle section area 43. A first end of the rear axle area 44 is connected to the first transverse beams 432 at the second end of the middle section area 43, and a second end of the rear axle area 44 is connected to the rear frame 30, on which a frame capable of accommodating an engine, a battery pack and other devices of the full-load passenger car is disposed near the bottom. Connecting rods 48 are disposed at the second end of the rear axle area 44 and connected perpendicularly to the two second longitudinal beams 441 respectively, one end of the second reinforcing members 452 is also connected to the connecting rods 48, and the second end of the rear axle area 44 is connected to the rear frame 30 through the connecting rods 48. With the second reinforcing members 452 connected to the connecting rods 48 at the second end of the rear axle area 44 and the first transverse beams 432 at the middle section area 43, the connection strength between the rear axle area 44 and the middle section area 43 can be increased, and the rear axle area 44 and the middle section area 43 can share stress, thereby increasing the stressed area of the underframe 40, and improving the overall carrying strength of the underframe 40.

To increase the connection strength between the rear axle area 44 and the rear frame 30, according to an embodiment of the present disclosure, two second diagonal tie bars 443 are disposed on the two second longitudinal beams 441 at the second end of the rear axle area 44 respectively, where the two second diagonal tie bars 443 on each of the second longitudinal beams 441 are distributed symmetrically around the second longitudinal beam 441, and the second diagonal tie bars 443 are connected to the second longitudinal beams 441 and the rear frame 30 respectively, so as to ensure the overall stability of the full-load passenger car body structure while increasing the connection strength between the rear axle area 44 and the rear frame 30.

Based on the same concept, two second diagonal tie bars 443 are also disposed at joints between the middle section area 43 and the rear axle area 44. The two second diagonal tie bars 443 are disposed at ends of the two first longitudinal beams 431 respectively, where the two diagonal tie bars are connected to first ends of the middle section area 43 and the rear axle area 44 respectively. The connection strength between the second end of the middle section area 43 and the first end of the rear axle area 44 can be improved by the second diagonal tie bars 443, and details are not described herein again.

According to an embodiment of the present disclosure, the rear axle area 44 includes two rear axle supports enclosed by the two second longitudinal beams 441 and the plurality of second transverse beams 442. Therefore, four wheels can be mounted in the rear axle area 44. To some extent, the carrying strength of the underframe 40 can be increased by disposing four wheels in the rear axle area 44 on the underframe 40. In addition, the rear axle area 44 has a simple structure, which greatly reduces the overall weight of the full-load passenger car body structure and achieves light weight.

According to an embodiment of the present disclosure, the two first longitudinal beams 431 are integrally formed with or welded to or detachably connected to the two second longitudinal beams 441, so that the two first longitudinal beams 431 are connected to the two second longitudinal beams 441 respectively to form the main longitudinal beams 46. Preferably, the two first longitudinal beams 431 and the two second longitudinal beams 441 are welded in a way that facilitates assembly and improves the reliability of the connection therebetween.

In conclusion, the full-load passenger car body structure provided by the embodiments of the present disclosure has a simple structure, and the first reinforcing members 451 are disposed respectively at joints on the underframe 40 to increase the connection strength between the first longitudinal beams 431 and the first transverse beams 432, and between the second longitudinal beams 441 and the second transverse beams 442. The rear axle area 44 is connected to the middle section area 43 by the second reinforcing members 452, so that stress can be shared and the carrying strength can be improved. With the plurality of first diagonal tie bars 433 disposed in the space enclosed by the two first longitudinal beams 431 in the middle section area 43, the structural strength is strengthened while meeting the requirements of simple structure and light weight. The connection strength between the middle section area 43 and the rear axle area 44, and between the rear axle area 44 and the rear frame 30 can be improved by disposing the second diagonal tie bars 443. Therefore, on the premise of ensuring the full-load reliability, the full-load passenger car body structure provided by the embodiments of the present disclosure simplifies the structure of the underframe 40, thereby achieving the overall light weight of the full-load passenger car body structure, and reducing the energy consumption.

It can be understood that "a plurality of" in the present disclosure means two or more, and other quantifiers are similar. "And/or", which describes an association relationship between associated objects, indicates that there can be three types of relationships. For example, "A and/or B" can represent three cases: only A, A and B, and only B. The character "/" usually represents that involved associated objects are in an "or" relationship. The singular forms of "a/an", "said" and "the" are also intended to include plural forms, unless otherwise specified in the context clearly.

It can be further understood that the terms "first", "second" and the like are used to describe various kinds of information, but these information should not be limited to these terms. These terms are only used to distinguish the same type of information from each other, and do not indicate a specific order or importance. In fact, expressions such as "first" and "second" can be used interchangeably. For example, without departing from the scope of the present disclosure, the first information may also be referred to as the second information, and similarly, the second information may also be referred to as the first information.

It can be further understood that an orientation or positional relationship indicated by the terms "center", "longitudinal", "transverse", "front", "back", "up", "down", "left", "right", "vertical", "horizontal", "top", "bottom", "inner", "outer" and the like is an orientation or positional relationship shown based on the accompanying drawings, is intended only to facilitate the description of the embodiment and simplification of the description rather than indicating or implying that a device or element referred to must have a specific orientation, or be constructed and operated in a specific orientation.

It can be further understood that, unless otherwise specified, "connection" includes both direct connection without other components between the two and indirect connection with other elements between the two.

It can be further understood that although operations are described in a specific order in the accompanying drawings in the embodiments of the present disclosure, it should not be understood that these operations are required to be performed in the specific order shown or in a serial order, or that all the operations shown are required to be performed to achieve desired results. In certain circumstances, multitasking and parallel processing may be advantageous.

Other embodiments of the present disclosure will be readily available to those skilled in the art after considering the specification and implementing the invention disclosed here. This application is intended to cover any variations, uses, or adaptive changes of the present disclosure, which follow the general principles of the present disclosure and include common general knowledge or conventional technical means in the art that are not disclosed in the present disclosure. The specification and embodiments are to be considered as illustrative only. The true scope and spirit of the present disclosure are indicated by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A full-load passenger car body structure, comprising:
a roof frame,
a side wall frame,
a rear frame, and
an underframe,
wherein the side wall frame is enclosed to form an accommodating space, the roof frame is disposed on an upper part of the side wall frame, and the underframe is disposed on a lower part of the side wall frame;
wherein the underframe is divided into a front section area, a front axle area, a middle section area and a rear axle area from front to back, and
wherein a plurality of reinforcing members are disposed on the underframe and used for reinforcing connection strength of the underframe; wherein:
the underframe comprises two main longitudinal beams and a plurality of transverse beams,
the plurality of transverse beams are disposed perpendicularly to the main longitudinal beams respectively, and
the reinforcing members are overlapped at joints between the transverse beams and the main longitudinal beams.

2. The full-load passenger car body structure according to claim 1, wherein:
the middle section area comprises two first longitudinal beams and a plurality of first transverse beams,
the plurality of first transverse beams extend between the two first longitudinal beams and are disposed perpendicularly to the first longitudinal beams respectively,
first and second ends of the plurality of first transverse beams are connected to the side wall frame, and first diagonal tie bars are disposed in a space enclosed by the two first longitudinal beams and the plurality of first transverse beams.

3. The full-load passenger car body structure according to claim 2, wherein:
the rear axle area comprises two second longitudinal beams and a plurality of second transverse beams,
the plurality of second transverse beams are disposed outside the second longitudinal beams, disposed perpendicularly to the second longitudinal beams respectively, and connected at opposite positions of the two second longitudinal beams respectively,
the reinforcing members comprise longitudinal bars that are disposed between the two second longitudinal beams, and
first and second ends of the longitudinal bars are connected to the rear axle area and the middle section area respectively.

4. The full-load passenger car body structure according to claim 3, wherein:
a first end of the rear axle area is connected to the first transverse beam at one end of the middle section area, and a second end of the rear axle area is connected to the rear frame; and
wherein connecting rods are disposed at the second end of the rear axle area and connected to the two second longitudinal beams, the rear frame and one end of the reinforcing members respectively.

5. The full-load passenger car body structure according to claim 4, wherein:
two second diagonal tie bars are disposed on the two second longitudinal beams at the second end of the rear axle area respectively, and
the second diagonal tie bars are connected to the second longitudinal beams and the rear frame respectively.

6. The full-load passenger car body structure according to claim 3, wherein the two first longitudinal beams are integrally connected or detachably connected to the two second longitudinal beams respectively to form the main longitudinal beams.

7. The full-load passenger car body structure according to claim 3, wherein:
the reinforcing members comprise first reinforcing members and second reinforcing members; and wherein:
the first reinforcing members are disposed at joints between the first longitudinal beams and the first transverse beams and joints between the second longitudinal beams and the second transverse beams;
the first reinforcing members comprise third diagonal tie bars; and
the second reinforcing members further comprise two longitudinal bars and a plurality of crossbars, and the plurality of crossbars are disposed at intervals and connected perpendicularly to the longitudinal bars respectively.

8. The full-load passenger car body structure according to claim 7, wherein:
the two longitudinal bars are disposed in parallel, and
the plurality of crossbars are disposed in parallel at an equal interval.

9. The full-load passenger car body structure according to claim 3, wherein the rear axle area comprises two rear axle supports enclosed by the two second longitudinal beams and the plurality of second transverse beams.

* * * * *